(12) United States Patent
Dieter et al.

(10) Patent No.: US 12,534,141 B2
(45) Date of Patent: Jan. 27, 2026

(54) FIFTH WHEEL, METHOD FOR DETERMINING A LOAD CONDITION AND/OR A WEAR CONDITION OF A FIFTH WHEEL AND METHOD FOR UPGRADING A FIFTH WHEEL

(71) Applicant: SAF-HOLLAND GmbH, Bessenbach (DE)

(72) Inventors: Daniel Dominik Dieter, Griesheim (DE); Dominik Haßler, Munich (DE); Kilian Köbschall, Mainz (DE); Björn Poss, Windesheim (DE); Patrick Scholl, Hirschhorn (DE); Gunnar Vorwerk-Handing, Darmstadt (DE); Mario Sebastian Köster, Bodman-Ludwigshafen (DE)

(73) Assignee: SAF-HOLLAND GmbH, Bessenbach (DE)

( * ) Notice: Subject to any disclaimer, the term of this patent is extended or adjusted under 35 U.S.C. 154(b) by 940 days.

(21) Appl. No.: 17/753,417

(22) PCT Filed: Sep. 8, 2020

(86) PCT No.: PCT/EP2020/075062
§ 371 (c)(1),
(2) Date: Mar. 2, 2022

(87) PCT Pub. No.: WO2021/048119
PCT Pub. Date: Mar. 18, 2021

(65) Prior Publication Data
US 2022/0289317 A1    Sep. 15, 2022

(30) Foreign Application Priority Data
Sep. 10, 2019 (DE) .................... 10 2019 124 273.8

(51) Int. Cl.
*B62D 53/08* (2006.01)
*G01D 5/14* (2006.01)

(52) U.S. Cl.
CPC ...... *B62D 53/0885* (2013.01); *B62D 53/0807* (2013.01); *G01D 5/14* (2013.01)

(58) Field of Classification Search
CPC ............ B62D 53/0885; B62D 53/0807; G01D 5/14
See application file for complete search history.

(56) References Cited

U.S. PATENT DOCUMENTS 5,435,194 A      7/1995  Schedrat et al.
6,302,424 B1 *  10/2001  Gisinger ................ B62D 53/08
                                                         280/433
(Continued)

FOREIGN PATENT DOCUMENTS

CN    106114658 B    11/2016
CN    207241333 U     4/2018
(Continued)

OTHER PUBLICATIONS

European Patent Office, International Search Report; Nov. 4, 2020; entire document.
(Continued)

*Primary Examiner* — Valentin Neacsu
*Assistant Examiner* — Marlon A Arce
(74) *Attorney, Agent, or Firm* — Price Heneveld LLP

(57) ABSTRACT

A fifth wheel configured to reversibly couple a trailer to a tractor including a coupling plate configured to receive a journal element of the trailer and a bearing block configured to pivotably bear the coupling plate about a pivot axis, in particular about a horizontally extending pivot axis, at least one distance sensor being provided which determines a distance with respect to a reference surface, the at least one
(Continued)

distance sensor and/or the reference surface being arranged as part of the bearing block or on the bearing block.

16 Claims, 6 Drawing Sheets

(56) References Cited

U.S. PATENT DOCUMENTS

| | | | | |
|---|---|---|---|---|
| 9,616,943 | B2* | 4/2017 | Burchett | B62D 35/001 |
| 2002/0024430 | A1 | 2/2002 | Schutt et al. | |
| 2008/0029995 | A1* | 2/2008 | Alguera | B62D 53/0807 |
| | | | | 280/407.1 |
| 2008/0036173 | A1* | 2/2008 | Alguera | B62D 53/068 |
| | | | | 296/180.3 |
| 2017/0174019 | A1* | 6/2017 | Lurie | B60D 1/015 |
| 2017/0334256 | A1* | 11/2017 | Scheips | G01B 21/32 |
| 2021/0300136 | A1* | 9/2021 | Algüera | B60D 1/64 |
| 2022/0332154 | A1* | 10/2022 | Köster | B60D 1/64 |

FOREIGN PATENT DOCUMENTS

| | | |
|---|---|---|
| CN | 109690097 B | 12/2020 |
| DE | 60036184 T2 | 5/2008 |
| DE | 102006057327 A1 | 6/2008 |
| DE | 102004045662 B4 | 10/2008 |
| EP | 2623344 A1 | 8/2013 |
| WO | 2001032497 A1 | 5/2001 |
| WO | 2006029732 A1 | 3/2006 |
| WO | 2006103480 A1 | 10/2006 |
| WO | 2017152234 A1 | 9/2017 |

OTHER PUBLICATIONS

Wikipedia article "Capacitive Sensor", URL: https://de.wikipedia.org/wiki/Kapazitiver_Sensor; retrieved on Jun. 12, 2020 at 15:26.

* cited by examiner

FIFTH WHEEL, METHOD FOR DETERMINING A LOAD CONDITION AND/OR A WEAR CONDITION OF A FIFTH WHEEL AND METHOD FOR UPGRADING A FIFTH WHEEL

BACKGROUND OF THE INVENTION

The present invention relates to a fifth wheel, a method of determining a load condition and/or a wear condition of a fifth wheel, and a method of upgrading a fifth wheel.

Fifth wheels are well known from the state of the art. They are generally used to connect, in particular reversibly connect, a trailer, in particular a semi-trailer, to a tractor in order to form a semi-trailer truck. In particular, the present invention relates to the determination of load collectives or acting moments of force and forces which act on the fifth wheel, in particular in the coupled state.

For this purpose, it is known from the prior art to measure forces acting between a king pin of the trailer and a coupling plate of the fifth wheel. For example, the installation of a force sensor in the king pin has been described. However, only part of the force flow can be measured here, as force transmission typically also takes place via frictional forces between the trailer and the coupling plate.

DE 10 2006 057 327 B4 describes the measurement of forces between a mounting plate or mounting surface of the tractor and a fifth wheel by means of measuring elements arranged between the mounting surface and the fifth wheel. However, there is a large number of different variants of mounting plates or mounting surfaces, so that a different solution would have to be designed for each one. In addition, the influence of the vehicle frame is comparatively high at this point between the fifth wheel and the mounting plate, so that a corresponding deformation of the vehicle frame can influence the measured forces.

U.S. Pat. No. 6,302,424 B1 describes a force measurement at the bearings of the coupling plate. However, this does not take into account that the force flow is divided between a bearing insert and a damping element. Accordingly, a ratio of the division into these two force paths would have to be determined, which, however, is not possible due to ageing and wear of the bearing insert or the damping element.

Based on this, the present invention has set itself the object of providing a fifth wheel with which it is possible to draw conclusions about the flow of forces through the fifth wheel in a manner that is as unbiased as possible and/or to provide a fifth wheel by means of which it is possible to record—at least indirectly—the forces and/or torques. In addition, it is desirable to upgrade existing fifth wheels as easily as possible in order to determine the force flow in these fifth wheels.

SUMMARY OF THE INVENTION

In accordance with a first aspect of the present invention, there is provided a fifth wheel for reversibly coupling a trailer to a tractor, comprising:
  a coupling plate for receiving a pivot element of the trailer and
  a bearing block for the pivotable bearing of the coupling plate about a pivot axis, in particular about a horizontally extending pivot axis,
  wherein at least one distance sensor is provided which determines a distance relative to a reference surface, wherein the at least one distance sensor and/or the reference surface is part of the bearing block or is arranged on the bearing block. In contrast to the fifth wheels known from the prior art, at least one distance sensor is provided in the fifth wheel according to the invention, with which a distance can be determined with respect to a reference surface, wherein the distance sensor or the reference surface is part of the bearing block or is attached thereto. The determined distance provides information about the size and/or shape of a deformation of the fifth wheel under a certain load. Based on the determined distance and taking into account a correspondingly selected stiffness model for the bearing block, it is advantageously possible to draw conclusions about the current load condition or a wear condition of the fifth wheel, in particular of the bearing block. By means of the currently detected load condition, it is then possible, for example, to draw conclusions in an advantageous manner about a current driving condition of the semi-trailer truck. For example, it is possible to deduce a road inclination, an acceleration, a curve radius and/or a load on the semi-trailer truck. Such information can be used advantageously for the autonomous driving of a semi-trailer truck or its control, for example to optimize the energy consumption of the semi-trailer truck. In addition, it is conceivable to examine the recorded load conditions with regard to their long-term development and, on the basis of this examination, to gain knowledge that improves the driving safety and control of the permissible use of the semi-trailer trucks. For this purpose, the coupling plate is preferably pivotably attached to the bearing block, in particular to its outer side, around the pivot axis. Due to the pivotable bearing of the coupling plate on the bearing block, the coupling plate can be displaced about a pivot axis running essentially horizontally and transversely to the longitudinal direction of the tractor unit, whereby a tilting between trailer and tractor unit is possible or this tilting or pitching movement can be followed within the semi-trailer truck. Such pitching movements occur especially when driving uphill and/or downhill, for example on a ramp. Advantageously, however, the pivot axis is arranged at an invariable distance from the reference surface and/or the centre of gravity of the bearing block. In other words, this can mean that the pivot axis is unchangeable relative to the reference surface or the centre of gravity of the bearing block or the centres of gravity of all bearing blocks, except for changes in position due to locking. In this way, a particularly mechanically resilient system can be achieved. An essential component of the bearing block is a bearing block eye, which is spaced apart from the mounting surface to which the bearing block is fixed, e.g. to the frame of the vehicle. The coupling plate is indirectly connected to the outer side of the bearing block eye via a bearing insert. Preferably, the bearing block is rigidly designed. Rigidly designed means in particular that the bearing block does not have any height adjustability, for example, especially by means of an automatic system. Preferably, the trailer is a semi-trailer whose front section in the coupled state is arranged above a rear section of the tractor in which the fifth wheel is mounted. In particular, it is envisaged that the king pin element is insertable into a slot-like opening in the coupling plate and is fixable therein in a final position in which the king pin or the king pin element is pivotably beard about a substantially vertical direction in order to allow appropriate buckling between the tractor and the trailer when cornering.

Preferably, the fifth wheel comprises at least three distance sensors. By means of at least three distance sensors, it is advantageously possible to detect a three-dimensional deformation of the bearing block, whereby a detailed picture of the load condition can be created, in particular with regard to the different spatial directions. It is conceivable that the distance sensors each detect a vertical distance or a vertically measured distance. Alternatively, it is conceivable that the detected distances are measured in directions that are oblique, in particular perpendicular, to one another. It is particularly preferred if the three distance sensors can determine and/or measure at least the distance in two, advantageously three, different perpendicular spatial directions. Therefore, for example, one sensor can measure or determine a vertical distance and two sensors a horizontal distance. In this way, a reliable load determination can be achieved in a particularly simple manner.

In a preferred embodiment, it is provided that the fifth wheel comprises a first distance sensor for detecting a distance in a first direction and a second distance sensor for detecting a distance in a second direction, wherein the first direction and the second direction are non-parallel to each other. In this way, the deformation of the bearing block can be detected or estimated in an advantageous manner at least in one sectional plane. Preferably, this vertical sectional plane are parallel to the longitudinal direction of the tractor or parallel to the mounting surface of the bearing block. It is particularly preferred, in order to obtain an independence of the measurements, if the first and the second direction are perpendicular to each other.

The fifth wheel is expediently equipped with a third distance sensor for detecting a distance in a third direction, wherein the third direction is not parallel to the first direction and/or the second direction, in particular perpendicular to the first and the second direction respectively. For example, it is conceivable that a distance between two bearing blocks opposite each other in the transverse direction of the semitrailer truck is detected by means of the third distance sensor. On the basis of the distance between the two bearing blocks, it is possible, for example, to draw conclusions about possible road inclination and/or cornering.

Preferably, the distance sensor contactlessly determines a distance to the reference surface. For example, capacitive and/or inductive distance sensors are used for this purpose. Alternatively, it is conceivable that the distance sensor determines a distance optically, for example by means of laser light, and/or by means of ultrasound. Accordingly, when arranging the distance sensor, it must be ensured that the distance sensor is aligned with a corresponding reference surface. Advantageously, the distance sensor therefore interacts metrologically with a reference surface. The reference surface is advantageously electrically conductive. This can facilitate the use of capacitive and inductive sensors.

Preferably, the at least one distance sensor is arranged in such a way that it determines a distance between a mounting surface, by means of which the bearing block is fixed or attached to the vehicle frame in the mounted state, for example, and an underside of the bearing block facing the mounting surface. In this arrangement, the lowering of a bearing block eye is detected in particular if it is displaced towards the mounting surface due to occurring loads. The integration of such a distance sensor is comparatively simple, as the region between the bearing block eye and the mounting surface usually does not provide any further components and thus also enables a simple upgrade of existing fifth wheels.

Preferably, the reference surface is electrically conductive. In particular, the reference surface is made of a metal. It is conceivable that the reference surface is specifically designed for an optimal distance measurement, for example, it is subsequently connected to the bearing block and/or the mounting surface in order to enable an optimal determination of the distance. In particular, the method used to determine the distance is taken into account and the reference surface is designed accordingly. In particular, it is envisaged that the reference surface is at least partially flat, i.e. not curved.

In particular, the fifth wheel comprises a damping element, in particular an elastic damping element, wherein preferably the at least one distance sensor or the reference surface is arranged on or in the damping element and/or on or in a clamping element. In particular, it is provided that the coupling plate is connected or fixed to the outer side of the bearing block by means of the clamping element, in that the clamping element, which is for example in the form of a bolt, reaches through the bearing block eye and is connected to the coupling plate at one of the opposite end pieces of the clamping element, as a result of which the coupling plate is clamped to the outer side of the bearing block or the bearing block eye. By determining the distance with respect to the damping element, it is possible to draw conclusions about the state of wear of the damping element by means of long-term monitoring of this distance. Accordingly, it is possible to replace the damping element in time if the state of wear exceeds a predetermined threshold value.

In particular, it is intended that the at least one distance sensor or the reference surface is arranged on or in the coupling plate and/or on or in a bearing insert. With the arrangement in the bearing insert, it is advantageously possible to detect the state of wear of the bearing insert in order to obtain an indication that the bearing insert must be replaced if a limit value is exceeded. The bearing insert is provided for indirect sliding contact of the coupling plate with the outer side of the bearing block, in particular the bearing block eye. By means of the arrangement of the distance sensor on the coupling plate, it is also possible to detect to what extent a distance between the bearing block and the coupling plate has changed, which in turn is an indication that the bearing insert has become thinner, for example due to abrasion.

Preferably, the at least one distance sensor or the reference surface is arranged on or in the vehicle frame of the tractor and/or on or in a mounting surface of the vehicle of the tractor when mounted. Correspondingly, the arrangement of the distance sensor or the reference surface in the regions of the tractor that surround the bearing block allows a distance to be determined that provides information about the deformation of the bearing block. The bearing block is attached to a rear section of the tractor, in particular via the mounting surface. In particular, it is conceivable that the arrangement of the distance sensor can be adapted as flexibly as possible to constructional conditions or circumstances.

Preferably, the at least one distance sensor or the reference surface is arranged in or on a connection region of the bearing block, via which the bearing block is connected to the mounting surface in the mounted state. For example, the distance to the underside of the coupling plate can be detected with a distance sensor arranged in this way. Preferably, a distance sensor is arranged at each of the two connection regions, viewed in the longitudinal direction, with which the distance to the coupling plate is detected in the vertical direction. This makes it advantageously possible to draw conclusions, for example, about a tilt of the coupling plate or about bending of the coupling plate.

Preferably, the at least one distance sensor and the reference surface are arranged on an outer side of the bearing block facing the coupling plate. In particular, the distance sensor is aligned with a reference surface in the region of the bearing eye and the distance is measured at an angle to a plane that runs parallel to the mounting surface. This makes it possible, for example, to detect a deformation of the bearing block, in particular in the region of the bearing block eye, which typically occurs when acceleration or braking takes place in the semi-trailer truck.

It is preferably provided that the fifth wheel, in particular the bearing block, has a further sensor for detecting a force. For example, this is a force transducer which is integrated into the bearing block and with which a force value is detected at a specific point. In this case, the additional sensor is not a distance sensor that detects a distance relative to a reference surface. This allows an even more complete picture of the load condition to be depicted by means of the additional sensor. In particular, the additional sensor can be used for a redundancy measurement with regard to the distance sensors.

Preferably, the at least one distance sensor is integrated in a holder. It is particularly preferred that the at least three distance sensors are integrated into a common holder and thus form a sensor system with which at least three different distances on the bearing block are detected. In particular, each distance is a distance to the respective reference surface in the vicinity of the bearing block. Particularly preferably, the holder is not mounted on the bearing block itself, but the bearing block merely provides the reference surface, while the sensor system is arranged in the vicinity of the bearing block. Furthermore, a sensor system integrated in a common holder is particularly advantageous when upgrading fifth wheels. For example, it is conceivable that the common holder can be detachably attached to any point on the mounting surface by means of a magnet.

Another aspect of the present invention is a method for determining a load condition and/or a wear condition of a fifth wheel by means of at least one distance sensor, wherein the fifth wheel comprises
  a coupling plate for receiving a journal element of the trailer, and
  a bearing block for pivotably bearing the coupling plate about a pivot axis, in particular about a horizontally extending pivot axis,
  wherein at least one distance sensor is provided which determines a distance relative to a reference surface, wherein the at least one distance sensor and/or the reference surface is part of the bearing block or is arranged on the bearing block. All the properties and advantages described for the fifth wheel can be transferred analogously to the method for determining the load condition and/or the wear condition of the fifth wheel and vice versa.

In particular, it is provided that a stiffness model of the bearing block is adopted, on the basis of which a current load state is determined by means of the determined distances or the determined distance. For this purpose, the respective distance value is fed to a corresponding computer unit and determined accordingly by means of the computer unit and, particularly preferably, subsequently provided by the computer unit. For example, the detected load condition determined by the computer unit is made available to a control device, which determines the current driving condition of the semi-trailer truck on the basis of the load condition. It is conceivable that the control device includes further information in addition to the load condition of the fifth wheel in order to define the current driving condition of the semi-trailer truck as precisely as possible. Furthermore, it is conceivable that the determined load conditions or the currently determined driving condition are used for autonomous control of the semi-trailer truck or for controlling the recuperation.

Another aspect of the present invention is a method of upgrading a fifth wheel, wherein the fifth wheel includes
  a coupling plate for receiving a journal element of the trailer and
  a bearing block for pivotably bearing the coupling plate about a pivot axis, in particular about a horizontally extending pivot axis,
  wherein at least one distance sensor is mounted on the fifth wheel, wherein the distance sensor determines a distance relative to a reference surface, wherein the at least one distance sensor and/or the reference surface is part of the bearing block or is arranged on the bearing block. All of the features and advantages described for the fifth wheel can be applied analogously to the method for upgrading the fifth wheel and vice versa. In other words, the method for upgrading a fifth wheel can serve to obtain a fifth wheel as described above and below after upgrading.

BRIEF DESCRIPTION OF THE DRAWINGS

Further advantages and features result from the following description of preferred embodiments of the object according to the invention with reference to the attached figures. It shows.

DETAILED DESCRIPTION OF THE PREFERRED EMBODIMENTS

Figure 1:
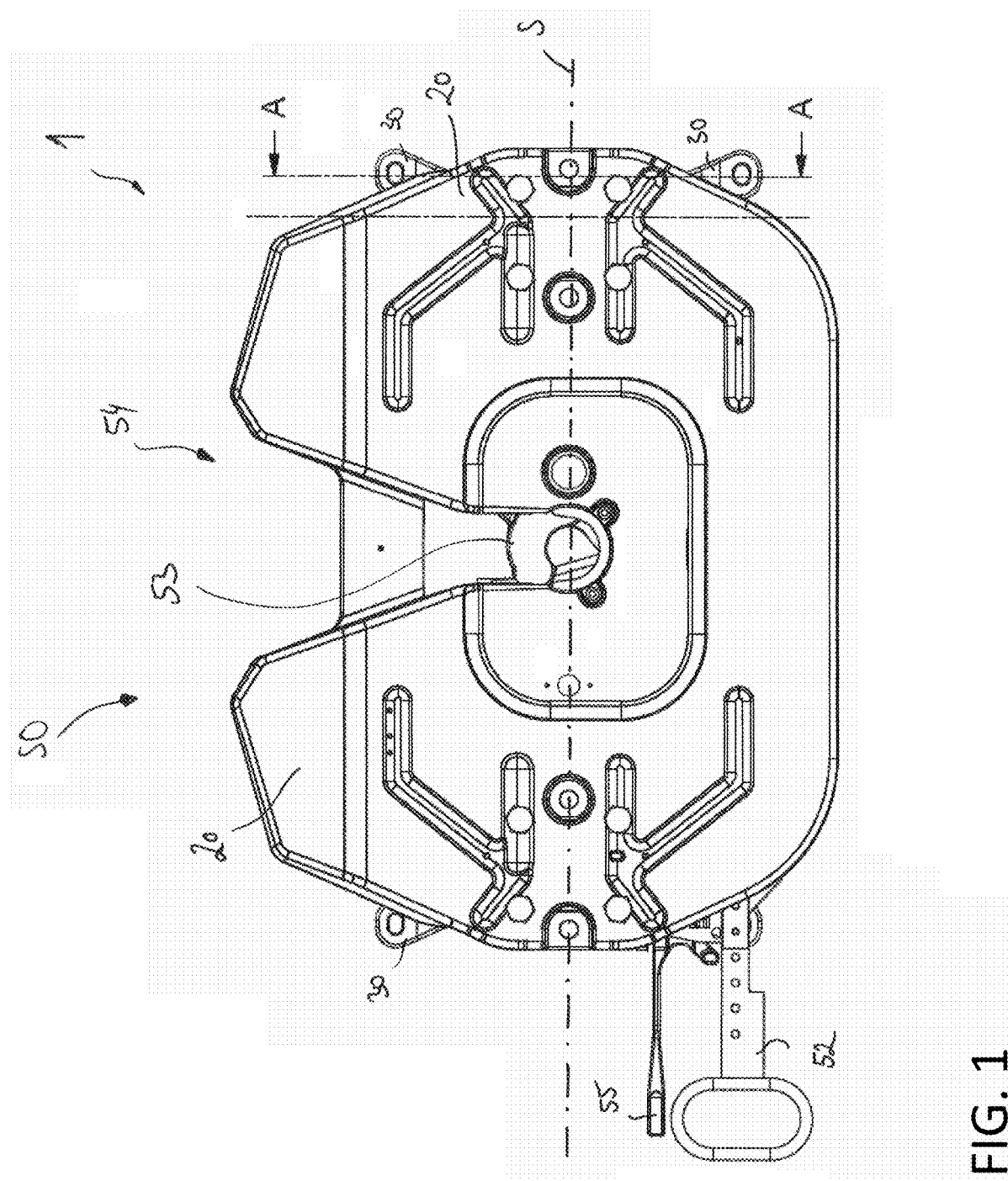
FIG. 1 schematically shows a fifth wheel according to a first exemplary embodiment of the present invention in a top view.

FIG. 1 schematically shows a fifth wheel 1 according to a first exemplary embodiment of the present invention. In particular, such a fifth wheel 1 is used for reversible, i.e. detachable, coupling of a trailer (not shown), in particular a semi-trailer, to a tractor (not shown) to form a semi-trailer truck. In the view shown in FIG. 1, a top view (from above) of the fifth wheel 1 is illustrated. The fifth wheel 1 comprises a coupling plate 20 for receiving a king pin element or a king pin of the trailer. The fifth wheel 1 is preferably connected in a rear section of a tractor to a corresponding mounting plate or mounting surface 25 and allows a trailer or semitrailer to be connected via its king pin element or king pin. For coupling, the king pin is inserted via an insertion region 54 on an open side OS of the coupling plate 20. The funnel-shaped insertion region 54 guides the king pin into its final position, in which it can be fixed with a lock piece 53. Such a lock piece 53 is preferably preloaded by means of a spring, so that the king pin in its final position can no longer leave the section at the end of the insertion region 54 which is limited by the lock piece 53. By means of an unlocking handle 52, the lock piece 53 can be pivoted or rotated in such a way that the path for the king pin to the open end of the insertion region 54 can be cleared and the king pin can finally leave the fixed position again if required. Furthermore, a locking device 55 is provided to ensure that the unlocking handle 52 is not accidentally opened or operated. In its fixed position, the kingpin is pivotably beard about an essentially vertical direction, so that the trailer and the tractor can be aligned at an angle to each other when cornering.

In order to permit an angled alignment, i.e. a pitching movement, between the tractor and the trailer with respect to the course of a roadway when driving uphill or downhill, it is provided that the coupling plate 20 is pivotably beard about a pivot axis S, in particular a pivot axis S extending essentially horizontally and transversely to the longitudinal direction of the tractor. For the pivotable bearing of the coupling plate 20, the coupling plate 20 is indirectly connected to at least one bearing block 30, preferably to two bearing blocks 30 opposite each other in the transverse direction of the tractor.

Figure 2:
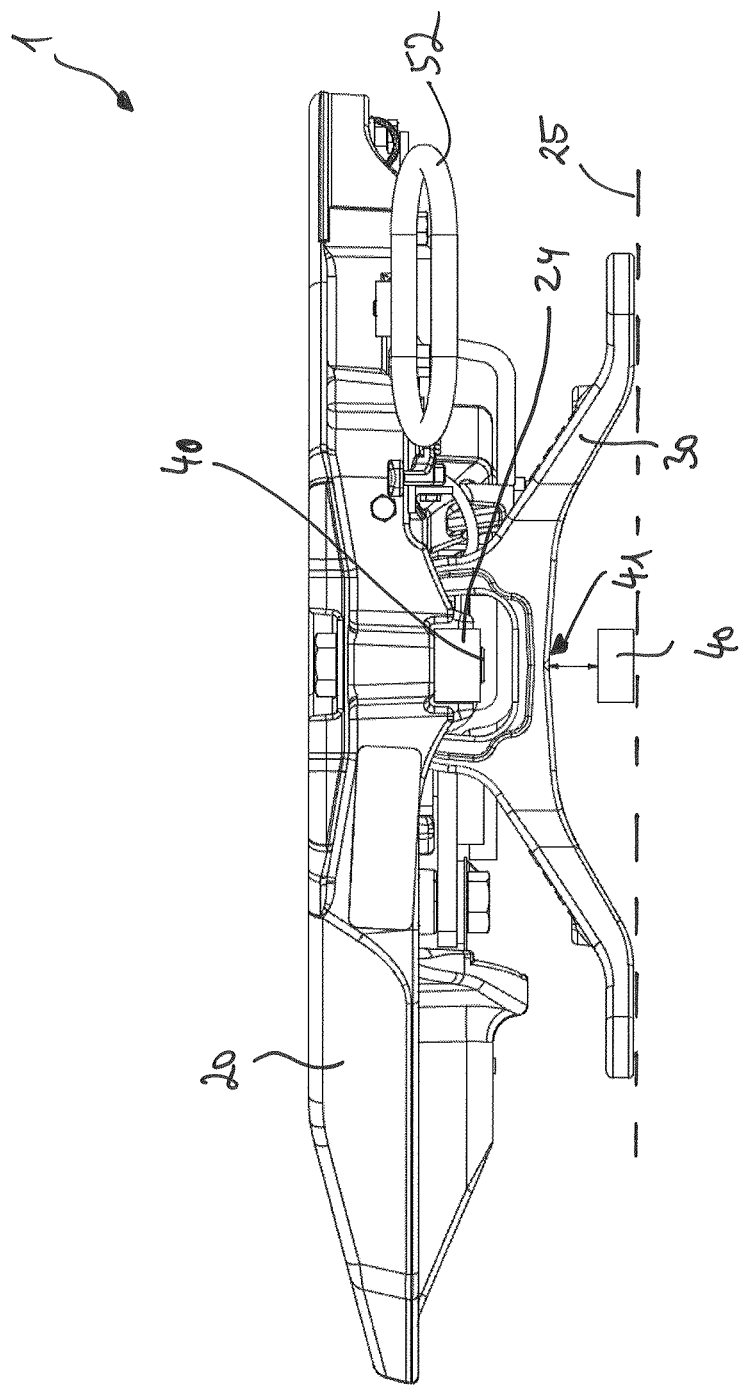
FIG. 2 schematically shows the fifth wheel from FIG. 1 in a sectional view.

FIG. 2 illustrates the fifth wheel 1 of FIG. 1 in a sectional view along the A-A line of FIG. 1. In the illustrated embodiment, the bearing block 30 is shaped like a bracket, whereby leg-like elements of the bearing block 30 have connection regions 45, via which the bearing block 30 can be mounted on a mounting surface 25 of the tractor unit. Seen in the longitudinal direction of the traction engine, the bearing block 30 has a bearing block eye 35 between the connection region 45 of the bearing block 30, which is vertically spaced apart from the mounting surface 25. For the pivotable bearing of the coupling plate 20, the coupling plate 20 is indirectly slidingly beard on an outer side of the bearing block 30 via a bearing insert 21. This means that during a pivoting movement of the coupling plate 20 about the pivot axis S, the coupling plate 20 with the bearing insert 21 is slidingly guided along the outer side of the bearing block 30, in particular along the outer side of the bearing block eye 35, and thus pivoted. For example, the coupling plate 20 is attached to the outer side of the bearing block 35 by means of a clamping element 24, in particular in the form of a bolt, which engages through the bearing block eye 35. A damping element 28, for example in the form of a rubber insert, is preferably provided in the bearing block eye 35 between the clamping element 24 and an inner side of the bearing block eye 35.

In the embodiment example shown in FIG. 2, the fifth wheel 1 further comprises at least one distance sensor 40, which is arranged, for example, on the mounting surface 25 and determines a distance with respect to a reference surface 41, wherein the reference surface 41 is part of the bearing block 30. In the embodiment example shown in FIG. 2, the distance sensor 40 or the measured distance between the mounting surface 25 and the outer side of the bearing block 30 facing the mounting surface 25 is formed centrally between the connection regions 45 of the bearing block 30. Alternatively, it is conceivable that the distance sensor 40, viewed in the longitudinal direction of the tractor, is arranged offset forwards or backwards compared to a central alignment. In particular, the distance sensor 40 in FIG. 2 measures a distance in a direction perpendicular to the mounting surface 25. It has been found that by means of a distance measurement it is possible to draw conclusions about a deformation, in particular elastic deformation, of the bearing block 30, which in turn can be used to determine the current load state of the fifth wheel 1. Preferably, the fifth wheel 1 comprises at least three distance sensors, each of which is assigned to a spatial direction, for example, so that conclusions can be drawn about a three-dimensional deformation of the fifth wheel. In particular, a stiffness model of the fifth wheel 1 is assumed for the determination of the load, on the basis of which, together with the determined deformation of the fifth wheel, conclusions can be drawn about the load on the fifth wheel or the current load state of the fifth wheel. For example, the distance sensor 40 is an inductive and/or capacitive distance sensor 40. Alternatively, it is conceivable that the distance sensor 40 is an optical sensor, which measures a distance by means of laser light, for example, or an ultrasonic sensor. Preferably, the distance sensor 40 is a sensor that determines the distance contactlessly.

Figure 3:
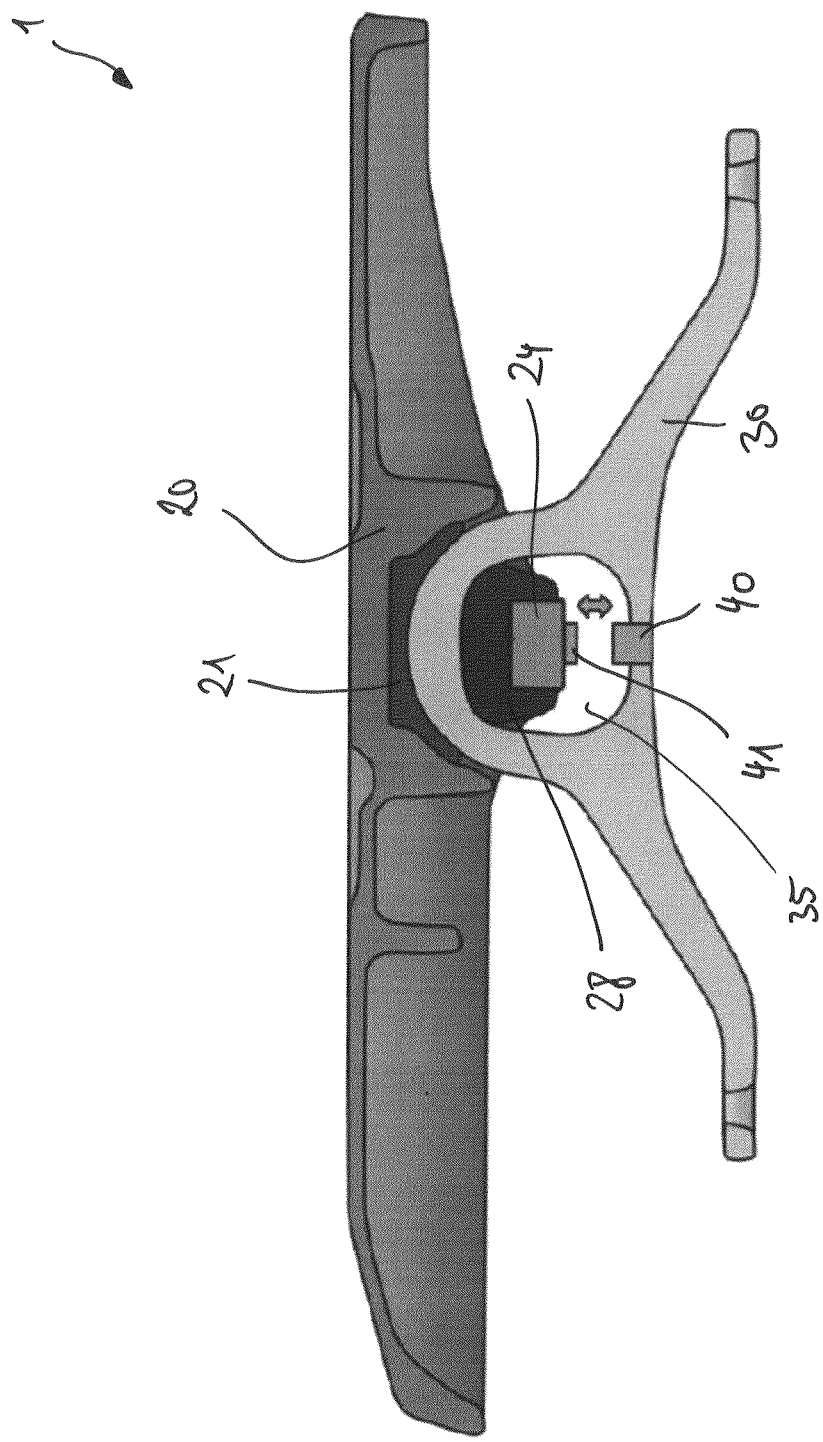
FIG. 3 schematically shows a fifth wheel according to a second exemplary embodiment of the present invention in a sectional view.

FIG. 3 shows a sectional view of a fifth wheel 1 according to a second preferred embodiment of the present invention. In particular, it is provided that the distance sensor 40 is arranged in the bearing block eye 35, in particular in such a way that a distance between the distance sensor 40 on the inside of the bearing block eye 35 and the clamping element 24 is determined in a substantially vertical direction. Accordingly, a reference surface 41 is formed on a side of the clamping element 24 facing the distance sensor 40. Long-term monitoring of the distance between the inside of the bearing block eye 35 and the clamping element 24 makes it advantageously possible to draw conclusions about the state of wear of the damping element 28. In contrast to the determination of the distance between the mounting surface and an outer side of the bearing block 30 facing the mounting surface, which serves to detect the current load, in the embodiment of FIG. 3 it is intended to implement long-term condition monitoring by means of the at least one distance sensor 40.

Figure 4:
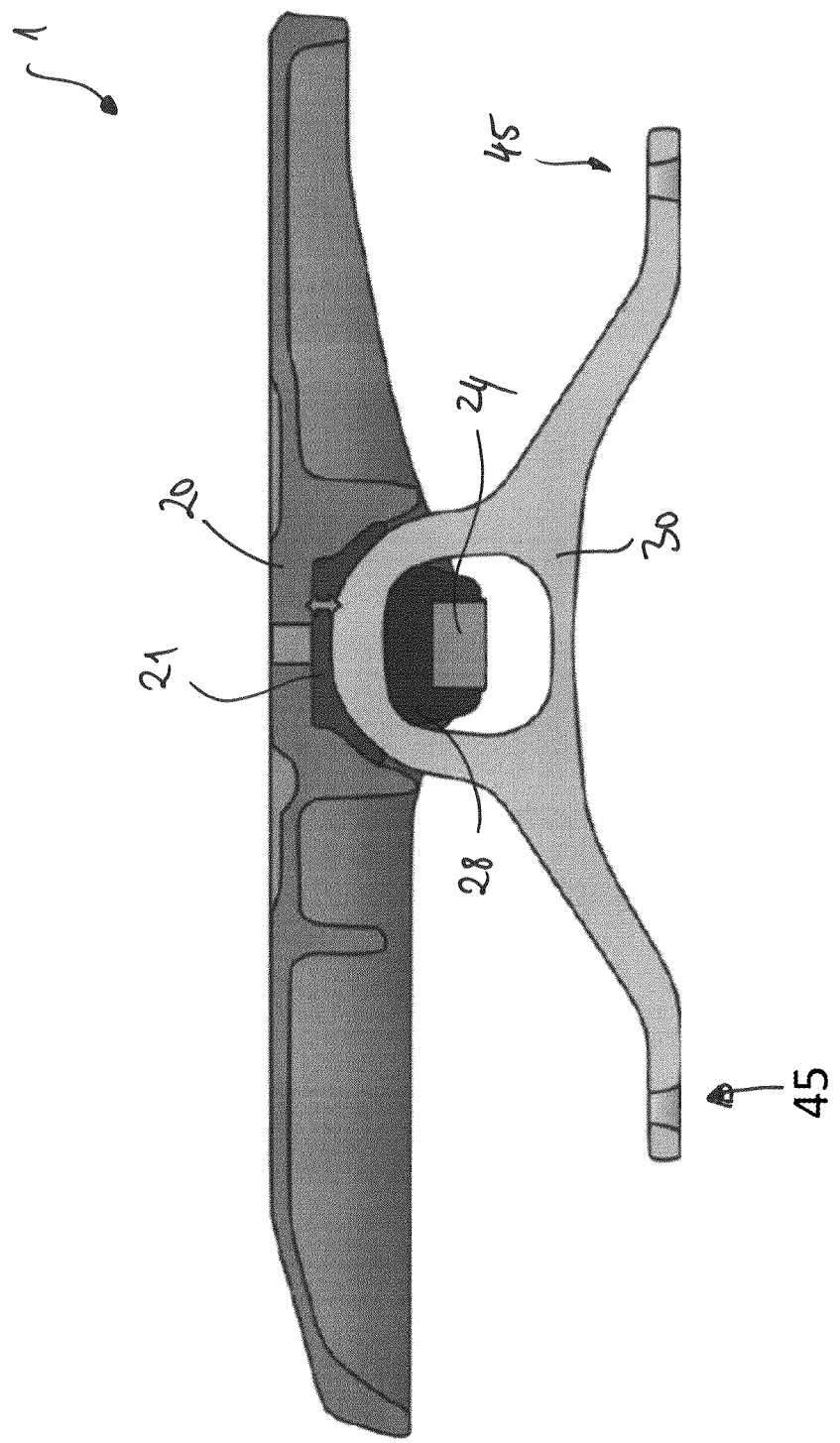
FIG. 4 schematically shows a fifth wheel according to a third exemplary embodiment of the present invention in a sectional view.

FIG. 4 shows a sectional view of a fifth wheel 1 according to a third preferred embodiment of the present invention. In this embodiment, it is provided that the at least one distance sensor 40 is arranged in such a way that a distance between the bearing block 30 and a side of the coupling plate 20 facing the bearing block 30 is determined. For this purpose, the reference surface 41 and/or the distance sensor 40 is arranged on an underside of the coupling plate 20. In particular, it is provided that a substantially vertically extending distance between coupling plate 20 and bearing block 30, in particular bearing block eye 35, is determined. In this way, wear of the bearing insert 21, which is arranged between the coupling plate 20 and the outer side of the bearing block 30, can be concluded in an advantageous manner. Accordingly, the embodiment example of FIG. 4 also provides for long-term monitoring of the distance in order to draw conclusions about potential wear in a corresponding manner.

Figure 5:
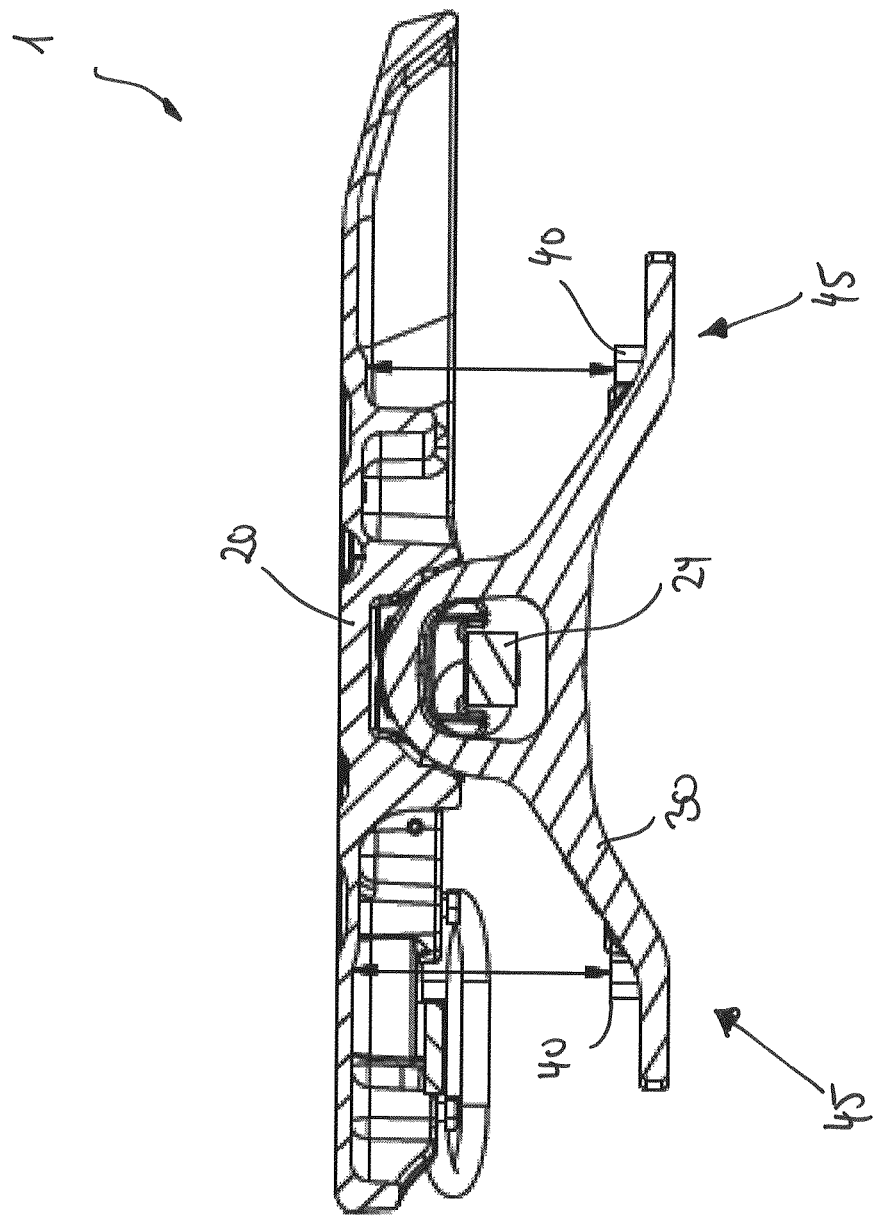
FIG. 5 schematically shows a fifth wheel according to a fourth exemplary embodiment of the present invention in a sectional view.

FIG. 5 shows a sectional view through a fifth wheel 1 according to a fourth preferred embodiment of the present invention. In this embodiment, it is provided that the at least one distance sensor 40 is arranged on the bearing block 30, in particular in the connection region 45 of the bearing block 30, and measures a distance from an underside of the coupling plate 20 measured essentially in the vertical direction. In particular, it is provided that a distance sensor 40 is arranged in each of the two connection regions 45, with which the distance in the vertical direction to the underside of the coupling plate 20 is measured. In this way, it is advantageously possible to draw conclusions about any bending of the coupling plate 20 or about a current angle of inclination of the coupling plate 20 on the basis of the distances detected by the two distance sensors 40, which in turn provides information about the current alignment between the tractor unit and trailer, in particular in relation to the roadway of the tractor unit.

Figure 6:
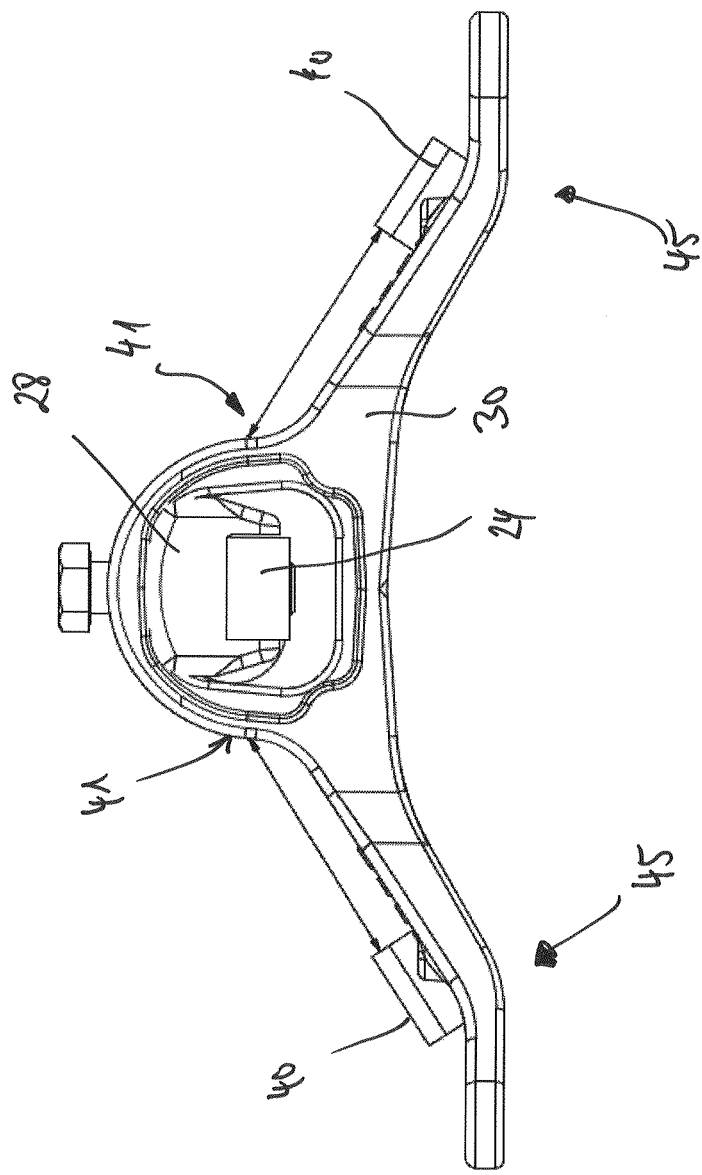
FIG. 6 schematically shows a fifth wheel according to a fifth exemplary embodiment of the present invention in a sectional view.

FIG. 6 shows a sectional view of a bearing block 30 for a fifth wheel 1 according to a fifth preferred embodiment of the present invention. In contrast to the embodiments in FIGS. 1 to 5, it is provided here that the distance is not measured in the vertical direction, but rather essentially at an angle to the mounting surface 25. In particular, it is provided that the distance sensor 40 is arranged in the connection region 45 and the reference surface 41 is arranged in the region of the bearing block eye 35, in particular on its outer side. This also allows information to be obtained or conclusions to be drawn about the current degree of deformation of the bearing block 30.

REFERENCE LIST 1 fifth wheel
20 coupling plate
21 bearing insert
24 clamping element
25 mounting surface
28 damping element
30 bearing block
35 bearing block eye
40 distance sensor
41 reference surface
45 connection region
52 unlocking handle
53 lock piece
54 insertion region
55 locking device
S pivot axis
OS open side

The invention claimed is:

1. A fifth wheel for reversibly coupling a trailer to a tractor, comprising:
a coupling plate configured to receive a journal element of the trailer; and
a bearing block configured to pivotably bear the coupling plate about a horizontally extending pivot axis;
wherein at least one distance sensor is provided which is configured to determine a distance relative to a reference surface, wherein the at least one distance sensor and/or the reference surface is part of the bearing block or is arranged on the bearing block, and wherein a current load condition and/or wear condition of the fifth wheel may be determined based on the determined distance and a selected stiffness model for the bearing block.

2. The fifth wheel according to claim 1, wherein the at least one distance sensor includes at least three distance sensors.

3. The fifth wheel according claim 1, wherein the at least one distance sensor includes a first distance sensor configured to detect a distance in a first direction and a second distance sensor configured to detect a distance in a second direction, and wherein the first direction and the second direction are non-parallel to each other.

4. The fifth wheel according to claim 1, wherein the at least one distance sensor is configured to contactlessly determine a distance to the reference surface with a capacitive and/or inductive distance sensor.

5. The fifth wheel according to claim 1, wherein the at least one distance sensor is arranged to determine a distance between a mounting surface of the at least one distance sensor and an underside of the bearing block facing the mounting surface.

6. The fifth wheel according to claim 1, wherein the reference surface is electrically conductive.

7. The fifth wheel according to claim 6, wherein the reference surface comprises metal.

8. The fifth wheel according to claim 1, further comprising:
an elastic damping element, wherein the at least one distance sensor or the reference surface is arranged on or in the damping element and/or on or in a clamping element.

9. The fifth wheel according to claim 1, wherein the at least one distance sensor or the reference surface is arranged on or in the coupling plate and/or on or in a bearing insert.

10. The fifth wheel according to claim 1, wherein, in the mounted state, the at least one distance sensor or the reference surface is arranged on or in the vehicle frame of the tractor, or on or in a mounting surface of the tractor unit.

11. The fifth wheel according to claim 1, wherein the at least one distance sensor or the reference surface is arranged in or on a connection region of the bearing block, via which the bearing block is connected to the mounting surface of the vehicle in the mounted state.

12. The fifth wheel according to claim 1, wherein the at least one distance sensor and the reference surface are arranged on an outer side of the bearing block facing the coupling plate.

13. The fifth wheel according to claim 1, wherein the bearing block includes a further sensor configured to detect a force.

14. The fifth wheel according to claim 1, wherein the at least one distance sensor is integrated in a holder.

15. A method for determining a load condition and/or a wear condition of a fifth wheel of claim 1 via the at least one distance sensor, wherein the fifth wheel includes the coupling plate and the bearing block.

16. A method for determining a load condition and/or a wear condition of a fifth wheel, comprising:
providing a coupling plate configured to receive a journal element of the trailer; and
providing a bearing block configured to the pivotable bear of the coupling plate about a horizontally extending pivot axis;
providing at least one distance sensor which is configured to determine a distance with respect to a reference surface, the at least one distance sensor and/or the reference surface being part of the bearing block or arranged on the bearing block;
sensing via the at least one distance sensor the distance with respect to the reference surface; and
determining a current load condition and/or wear condition of the fifth wheel based on the determined distance and a selected stiffness model for the bearing block.

* * * * *